June 20, 1967 P. J. CLARKE 3,326,512
METAL VALVE
Filed Oct. 1, 1964
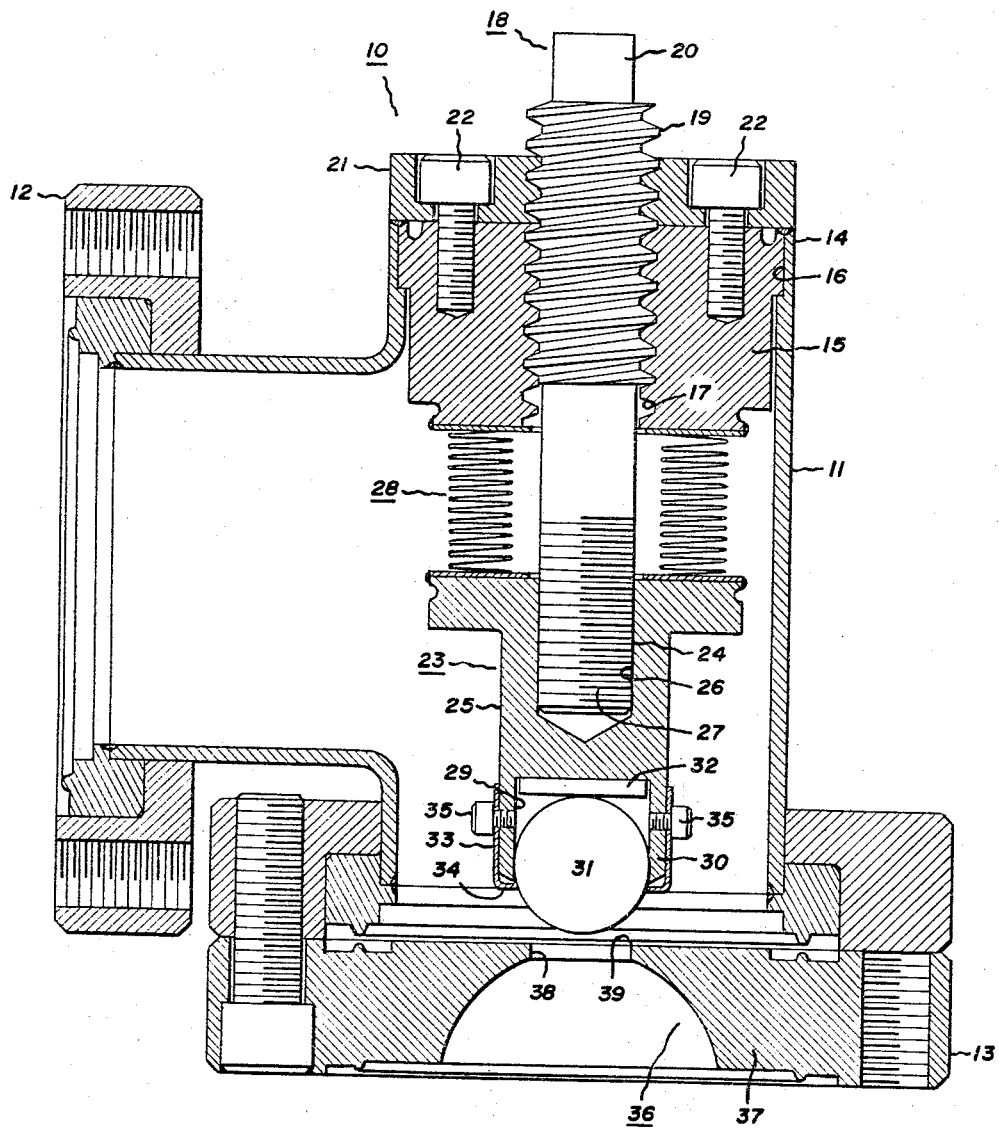
INVENTOR:
PETER J. CLARKE,
BY *James J. Lichiello*
HIS ATTORNEY.

United States Patent Office 3,326,512
Patented June 20, 1967

3,326,512
METAL VALVE
Peter Joseph Clarke, Scotia, N.Y., assignor to General Electric Company, a corporation of New York
Filed Oct. 1, 1964, Ser. No. 400,743
11 Claims. (Cl. 251—86)

This invention relates to a vacuum valve and more particularly, to a precision, hand-operated, screw-type ball valve.

In the usual type of a ball valve, wherein the operation of a screw means seats a ball over a circular aperture in a seat, the simplicity of both the seal and the operative mechanism lends favorable to a long and trouble-free life under odinary conditions. With the utilization of such a valve on high vacuum equipment wherein the valve must provide a seal, for example, between conditions on one side which are atmospheric and conditions on the other side which may reach $10^{-10}$ Torr., considerable difficulties in the sealing characteristics of such valves have been encountered. A most strenuous condition imposed upon such a high vacuum valve is the requirement of a high temperature bakeout process at temperatures ranging from 200° C.–500° C. Therefore, the valve must not only seal at very high differential pressures, but also must be able to withstand the high temperature bakeout conditions which are employed in connection with such high vacuum aparatus. It has accordingly been noted that there is a substantial increase in the number of failures of such valves when subjected to higher bakeout temperatures. There is also a substantial increase in the number of failures commensurate with the higher vacuums and higher temperature combinations which are employed. A further examination of these valves indicates that under the extreme conditions described, a large number of failures are associated with the materials employed for the seat and ball in combination with the imposed force thereon which is required to provide a good seal. In high vacuum systems presently being employed, there is a need for a repetitive high temperature, high vacuum valve operative over long periods of time without leakage, and particularly for those applications wherein the slightest leak over a period of time is a troublesome factor.

Accordingly, it is an object of this invention to provide an improved ball valve.

It is another object of this invention to provide an improved structural configuration for a ball valve.

It is another object of this invention to provide improved sealing means for a ball valve.

It is a further object of this invention to provide an improved floating ball configuration for a ball valve, together with improved operative means therefor.

It is yet another object of this invention to provide improved combinations of materials for a harder ball and softer seat combination in a ball valve.

Briefly described, this invention relates to a limited dual screw operated ball valve wherein a floating or free ball is moved axially with minimal rotary motion toward a circular knife-edge seat. The ball and seat materials are chosen of different and predetermined materials to be extremely resistant to high temperature, high vacuum conditions and to have the characteristics of avoiding precipitation of carbon along grain boundaries to cause seal deterioration.

This invention will be better understood when taken in connection with the following description and drawings in which The FIGURE is a cross-sectional illustration of one preferred embodiment of the valve of this invention.

Referring now to FIG. 1, there is illustrated one preferred embodiment of this invention in the form of a 90° ball valve 10. Ball valve 10 is generally constructed of a non-magnetic material having the inherent ability to withstand extreme operating conditions of high bakeout temperatures and high vacuum. Preferably, the valve 10 and most of the component parts are manufactured of a suitable stainless steel, one example being type 347 stainless steel. In the illustrated preferred embodiment of this invention, valve 10 includes a T-shaped casing or housing 11 which is provided with a pair of adjacent, conduit type flanges 12 and 13 defining a flow passage through casing 11 through a 90° bend. Within the remaining end 14 of the T casing 11, there is positioned a support block assembly 15, which supports the operating mechanism of the valve including the ball. In one form of this invention, the end 14 of casing 11 is counterbored as at 16 so that block 15 with its mating shoulder rests in counterbore 16. Thereafter, support 15 is circumferentially welded to end 14 in a vacuum tight manner.

The supporting block 15 includes a central threaded aperture 17 to threadedly receive therein a threaded driver bolt 18. Driver bolt 18 includes a first threaded section 19 adjacent end 20. End 20 is adapted to project externally of the valve proper to have suitable turning means attached thereto. Concentrically positioned on the end 14 of casing 11 and surrounding and threadedly engaging bolt 18 is a cap 21 which is in turn threadedly secured to support block 15 by means of cap screws 22. As can be seen in FIG. 1, in accordance with the description as given, a rotation of driver bolt 18 axially positions bolt 18 within the casing 11. The axial movement of bolt 18 is utilized to open and close the valve by means of a ball seal assembly 23 carried on the end 24 of driver bolt 18.

Assembly 23 includes a cup-shaped member 25 defining a threaded recess 26. Driver bolt 18 includes a second threaded section 27 on end 24 with the thread thereof being engageable with the thread of recess 26. The engagement between threaded recess 26 and threaded end section 27 is of a lubricated free-turning variety.

In order to prevent any leakage along the threaded aperture 17 between that aperture and bolt 18, there is provided between support block 15 and ball assembly 23 an extendable non-rotating sealing means in one form as a bellows 28. Bellows 28 is concentrically positioned about bolt 18 and is peripherally welded at one end to support 15 in a vacuum tight manner. The other end of bellows 28 is peripherally welded to cup member 25 in a vacuum tight manner. It can thus be seen that rotation of bolt means 18 will provide an axial movement of ball seal 23 by expansion and contraction of the bellows 28. The free turning arrangement between driver bolt threaded end 27 and threaded recess 26 minimizes any torque transfer to bellows 28.

Cup member 25 which defines a coaxial recess 26 facing in the direction to receive end 24 of bolt 18 also defines a further coaxial cylindrical recess 29 facing opposite the recess 26. Recess 29 is of a generally cylindrical configuration defined by a rim 30 and is described more specifically as a cylindrical pocket within the cup member 25. Within this pocket 29 there is positioned the ball seal means 31 of this invention. Ball seal means 31 is slidably fitted within rim 30 so that it is free to rotate therein. A backup member 32 in the bottom of pocket 29 limits the degree of insertion of ball 31 within pocket 29 so that a substantial portion of ball 31 protrudes from pocket 29 or from rim 30. In order to retain ball 31 within pocket 29, a thin metal, cupshaped member 33 having an inturned flange or lip 34 slidably covers rim 30 and is affixed thereto through screw means 35. It can thus be seen that, regardless of the axial position of ball assembly 23 within housing 11, ball 31 is retained therein since the lip 34 defines an aperture which is slightly smaller in diameter than the diameter of the ball 31. Since the lateral diameter of ball 31 is above the plane of lip 34, ball 31 is retained within the pocket 29 and is free to rotate therein.

Ball 31 is adapted to be axially moved toward and away from a seat assembly 36. The juncture of ball 31 with seat assembly 36 defines the seal area of this invention. Seat assembly 36 includes a metal block 37 having a concentric aperture 38 therethrough. Aperture 38 is positioned in concentric relationship to ball 31. In one preferred form of this invention, aperture 38 is defined as a cylindrical bore whose transverse plane is generally perpendicular to the axis of bolt 18, and whose diameter is smaller than the diameter of ball 31. Therefore, axial rotation of bolt 18 positions ball 31 partly within the aperture 38 so that the knife edge or 90° corner 39 of aperture 38 engages ball 31. Aperture 38 may also be defined by a washer type insert which is inserted in a block 37. One preferred combination in this invention utilizes a ball 31 diameter of 1", together with an aperture 38 whose diameter is ¾".

One important feature of this invention relates to the engaging thread relationship of driver bolt 18 to support block 15 and driver bolt 18 to ball assembly 23. With respect to threaded aperture 17 and driver bolt threaded section 19, the pitch or lead of this threaded relationship is in a predetermined proportion to the axial dimension of bellows 28. This proportionality permits bellows 28 to be forced to its fully retracted position before the threaded section 19 of driver bolt 18 becomes disengaged from aperture 17. The valve will not therefore be inadvertently disassembled upon continued turning of driver bolt. At the same time, however, the mentioned proportionality requires that the driver bolt 18 be substantially fully retracted so that its threaded portion 19 engages only cap 21 prior to removal of screws 22 to disassemble the valve.

The second important threaded relationship refers to threaded section 27 of driver bolt 18 engaging the threaded aperture 26. The proportionality of these mating threads is so chosen that when the valve assembly 23 and driver bolt 18 is fully retracted, there is no disengagement of the threads. Conversely, when the driver bolt is fully extended in the closed valve position, the threaded portion 24 does not bottom in aperture 26. Both elongated thread sections 19 and 27 of driver bolt 18 contribute substantially to the axial integrity of this precision valve.

It is a known feature in high pressure or high vacuum sealing art that the sealing area itself should be as small as possible commensurate with structural integrity of the parts. Accordingly, a ball resting on the edge of a smaller aperture washer provides an effective combination. However, one of the major contributing factors toward valve deterioration in high vacuum high temperature bakeout system is the wear and deformation associated with rotating a ball, similar to ball 31, within or against a knife-edge seat, such as 39. In many ball type valves, particularly those of the fixed ball type or those wherein a large amount of torque is transmitted to the ball, the combination of torque and contact area induces deformation, tearing, or other destruction of the metal interface exposed to the twisting force. One criterion of engaging or contact area between the ball and seat of the present invention is to provide minimum contact area so that minimum twisting or torque is exerted at the ball and seat interface. Additionally, the angle of contact or seating angle of ball and seat must be within prescribed limits. The angle of contact is described as the included angle between the centerline of driver bolt 18 and a line passing through a point in the contact area which is the end of a line passing from the center of the ball to the engaging edge of the seat. In one preferred practice of this invention with a ball diameter of ½" an angle of between about 50° to 55° performed with good results.

The knife edge of the present invention is not intended to be an easily deformed edge of extreme sharpness, nor, however, an edge which will provide a substantial peripheral area to engage ball 31 with high torque. There is no more than a sharp edge which has been polished to reduce the sharpness. It is recognized that once the ball 31 engages the seat edge 39, ball 31 must be substantially free to rotate; otherwise, twisting force or torque will be transmitted through ball 31 to seat edge 39, leading to mechanical failure thereof. The relationship of the parts, such as pocket 29 and rim 30 containing a free rotating ball 31 is such as to provide a minimal amount of frictional surface therebetween. Backup member 32 adjacent ball 31 may also be made of a very hard material and so chosen that the contact area between backup member 32 and ball 31 is maintained at a minimum. By these structural arrangements, the amount of torque exerted on ball 31 is also maintained at a minimum. Design control may be exercised over various parts engagement so that the forces tending to rotate ball 31 in its seat are less than restraining forces. Ordinarily the force tending to rotate ball 31 is transmitted through a very small contact area between ball 31 and backup member 32. The restraining force will be exerted by the seat contact area.

It has further been noted that ball and seat failure or deterioration is rather marked when ball valves are exposed to high temperature bakeout conditions over long periods of time. Some of the causes of failure are alloying of ball and seat metals, excessive metal flow, and metal bonding of the ball to the seat. Another factor related to failure of materials is that the high vacuum high temperature condition causes carbon precipitation at the grain boundaries of some metals, and this carbon precipitation destroys the effectiveness of the seal between the ball and the knife edge as well as deteriorating the metals themselves.

The ball and seat material combination should be carefully determined in view of the kinds of failures mentioned. It has been discovered that the ball and seat should be of relatively hard materials with the ball being extremely hard. Either metals or non-metals may be employed for the ball material. Preferably a metal for the ball should be an extremely hard metal such as the carbides, tungsten carbide being a preferred metal. A hard ceramic material for the ball would include a Lucalox alumina ceramic, sapphire and other similar ceramics. The seat material should be of a material of less hardness than the ball, for example a metal such as stainless steel, commercially available 347 stainless steel being preferred in combination with the tungsten carbide ball as described.

In an operative embodiment of this invention, a combination of a ½" tungsten carbide ball 31 with a 1 microinch polished finished rested within a 347 stainless steel seat 39 in the angle relationship as indicated provided extraordinarily good results over a long period of time. This combination withstood high temperature bakeout conditions with the valve in the open and closed condition wherein the temperature range was 250° to 450° C., and has been operative in vacuum systems where the low pressure conditions exceeded about $10^{-10}$ Torr. In addition, such a valve has been repetitively operative over a long period of time without deterioration and with effective sealing being attained during each application thereof. With closing forces exerted on bolt 18 to the extent of from about 15 to 20 inch pounds, it was found that plastic deformation of the 347 stainless steel seat was less than 5–10 mils, and there was no apparent deformation of the tungsten carbide ball.

While this invention has been described with reference to particular and exemplary embodiments thereof, it is to be understood that numerous changes can be made by those skilled in the art without actually departing from the invention as disclosed, and it is intended that the appended claims include all such equivalent variations as come within the true spirit and scope of the foregoing disclosure.

What I claim as new and desire to secure by Letters Patent of the United States is:

1. In a ball type high vacuum valve, the combination comprising
    (a) a casing having an inlet and an outlet,
    (b) seating means in said casing having an aperture therethrough,
    (c) rotary driver means threadedly engaging said housing and extending therein,
    (d) support means in said casing threadedly engaging said driver means and supporting a freely rotatable ball therein in concentric relationship to said aperture in said seat,
    (e) said rotary means rotatably operative in both said threaded engagements to move said ball axially toward said aperture to seat said ball on the edge of said aperture, and close said valve,
    (f) said rotary means providing minimal transmission of torque to said ball,
    (g) and means vacuum sealing said threaded engagements from environmental conditions in said casing.

2. In a high temperature high vacuum valve the combination comprising
    (a) a valve casing having an inlet and an outlet,
    (b) a valve seat in said casing,
    (c) said seat having a circular aperture therethrough defining a relatively sharp edge
    (d) a driver bolt means extending into and threadedly engaging said casing and adaptable on threaded rotation to move axially toward said aperture,
    (e) ball support means threadedly engaging said driver bolt means with a thread pitch different from the thread pitch of said driver bolt with said casing so that rotation of said driver bolt means in both said housing and said support moves said ball support means toward said seat relative to said driver bolt means,
    (f) sealing means vacuum sealing said driver bolt and both threaded engagments from said inlet and outlet,
    (g) a very hard material ball secured to said ball support adjacent said aperture,
    (h) said ball means being free to rotate relative to said driver and adapted to be positioned to concentrically engage the edge of said aperture and close said valve,
    (i) the engaging surfaces of said ball and said support generating a frictional force upon closing of the valve less than the frictional force generated between said ball and said seat so that said ball is not turned in said seat upon imposition of high closing torque.

3. The invention as recited in claim 2 wherein said ball is tungsten carbide and said seat is stainless steel.

4. The invention as claimed in claim 2 wherein said ball is ceramic.

5. The invention as claimed in claim 3 wherein said seat is type 347 stainless steel.

6. The invention as claimed in claim 2 wherein said ball is tungsten carbide and said seat is type 347 stainless steel.

7. The invention as recited in claim 2 wherein said ball is tungsten material and said seat is 347 stainless steel and wherein the seating angle of said ball and said seat is between about 50° to 55°.

8. A high temperature high vacuum ball valve comprising in combination:
    (a) a hollow casing having an inlet and an outlet,
    (b) a metal valve seat in said casing,
    (c) said seat having a circular aperture therethrough defining a 90° edge,
    (d) a driving bolt means extending into and threadedly engaging said casing and adapted upon rotation to move axially toward said aperture,
    (e) ball support means rotatably threadedly mounted on the end of said driving bolt adjacent said aperture,
    (f) a very hard material ball retained in said support means in free rotating relationship and adapted to be seated in said seat aperture to close said valve,
    (g) a flexible sealing member surrounding said driver bolt and connected to said ball support means and said casing to vacuum seal said bolt from said inlet and outlet so that said threaded engagements are not directly exposed to low vacuum conditions in said casing,
    (h) said sealing member sealed to said ball support and preventing rotation of said ball support,
    (i) the said threaded engaging relationship of said bolt in said casing and said support on said bolt, and said flexible sealing member therebetween cooperating to prevent disengagement of either of said threaded engagements during operation of said valve.

9. A high temperature high vacuum ball valve comprising in combination
    (a) a hollow T-shaped casing
    (b) a mounting flange on each of a pair of ends of said T section,
    (c) a support block means in the remaining end of said T section in vacuum tight relationship therewith,
    (d) said support block means having a threaded aperture therein,
    (e) threaded driver bolt means extending into said T section and threadedly engaging said support block for rotation therein,
    (f) ball support means threadedly engaging the internal end of said driver bolt for relative rotation therewith,
    (g) axially flexible sealing member surrounding said driver bolt and sealed in vacuum tight relationship to said support block and said ball support so that said threaded engagements on said block and said ball support means are not directly exposed to vacuum conditions in said casing,
    (h) a hard metal ball secured to said support means for relative rotation therewith,
    (i) said sealing member means preventing rotation of said support upon rotation of said driver bolt so that rotation of said driver bolt axially positions said ball support in said casing,
    (j) seat means in said casing,
    (k) said seat means having a circular aperture therethrough defining a sharp-edged aperture in concentric relationship to said ball,
    (l) the mating threads on said driver bolt and said support block being correlated so that compression of said flexible member limits axial motion in one direction of said driver bolt before either of said mating threads is disengaged, and in the opposite direction said ball is concentrically seated on said aperture to close said valve before said ball support mating threads are fully engaged.

10. A high temperature high vacuum ball valve comprising in combination
    (a) a hollow stainless steel T section casing,
    (b) a mounting flange on each of a pair of adjacent ends of said T section,
    (c) a support block means fixedly positioned in the remaining end of said T section,
    (d) said support block means having a threaded aperture therein,
    (e) threaded driver bolt means extending into said T section and threadedly engaging said support block for rotation therein,
    (f) ball support means threadedly engaging the internal end of said driver bolt for relative rotation therewith,
    (g) ball means supported in said support for relative rotation therewith,
    (h) a bellows assembly circumferentially surrounding and concentric with said driver bolt means,
    (i) said bellows being vacuum sealed to said support block and to said ball support, (j) said bellows preventing rotation of said ball support upon rotation of said driver bolt so that rotation of said driver bolt axially positions said ball support and said ball in said casing, (k) cap means releasably secured to said support block and surrounding and threadedly engaged with said driver bolt, (l) the mating threads on said driver bolt and said block support being correlated so that maximum contraction of said bellows limits axial motion of said driver bolt before said mating threads are disengaged, and with remaining engagement being limited solely to said cap.

11. A high temperature high vacuum ball valve comprising in combination (a) a hollow stainless steel T section casing, (b) a mounting flange on each of a pair of ends of said T section, (c) a support block means in the remaining end of said T section, (d) said support block means having a concentric threaded aperture therein, (e) threaded driver bolt means extending into said T section and threadedly engaging said support block for rotation therein, (f) ball support means threadedly engaging the internal end of said driver bolt, (g) a bellows assembly circumferentially surrounding and concentric with said driver bolt means and vacuum sealed to said support block and to said ball support, (h) said ball support defining a recess concentric with and receiving the end of said driver bolt, (i) said cup means defining a further cylindrical recess concentric with the said recess and oppositely facing therefrom, (j) a hard material backup plate in the bottom of said recess, (k) ball means retainably secured in said recess in free rotating relationship therein, (l) said ball means being of a tungsten carbide, (m) cup means having an in-turned flange defining a diameter smaller than said ball means and covering the end of said cup member to retain the ball within said recess, (n) seat block means positionably attached to said casing, (o) said seat block means having a cylindrical seat aperture therethrough concentric with said ball, (p) said driver bolt upon rotation thereof seating said ball in said seat aperture to close said valve, (q) said seat block being of stainless steel, (r) the engagement of said ball and said seat being in the angle relationship of 50° to 55°, and (s) means for axially moving said ball to engage said seat with minimal transmission of torque to said ball.

References Cited

UNITED STATES PATENTS

| | | | |
|---|---|---|---|
| 1,523,953 | 1/1925 | Giesler | 251—265 |
| 1,773,110 | 8/1930 | Meyers | 251—86 |
| 2,095,210 | 10/1937 | Bucknam | 251—368 X |
| 2,973,179 | 2/1961 | Kleinschmidt et al. | 251—86 |
| 3,040,770 | 6/1962 | Boettcher et al. | 251—368 X |
| 3,059,667 | 10/1962 | Coceano | 251—368 X |
| 3,101,094 | 8/1963 | McKenzie | 251—333 |
| 3,112,759 | 12/1963 | De Lucia | 251—335 X |
| 3,195,552 | 7/1965 | Rasmussen | 251—368 X |

M. CARY NELSON, *Primary Examiner.*

R. C. MILLER, *Assistant Examiner.*